Figures 1, 2:
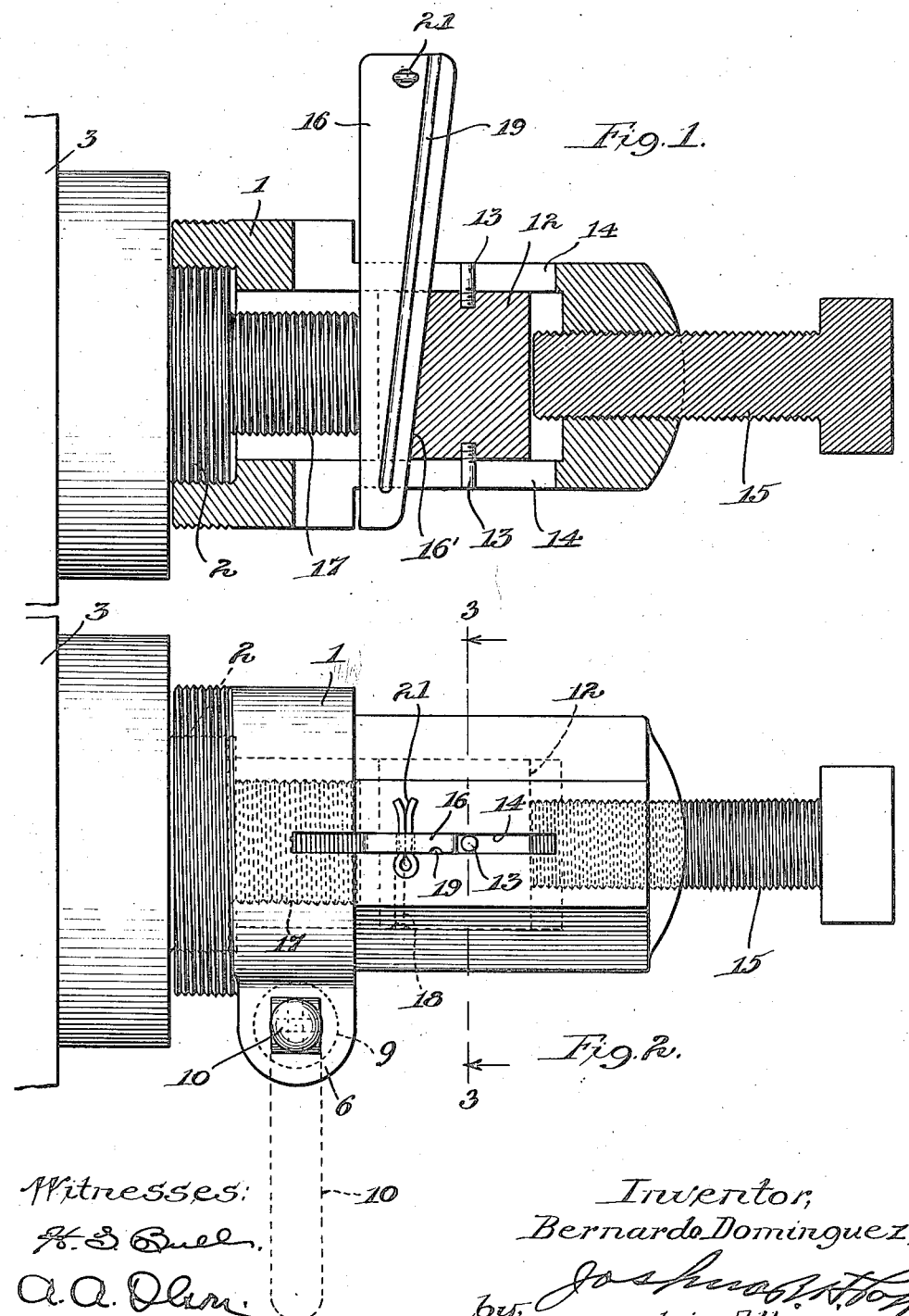

B. DOMINGUEZ.
REMOVER FOR WHEELS OR THE LIKE.
APPLICATION FILED APR. 8, 1916.

1,229,725.

Patented June 12, 1917.
2 SHEETS—SHEET 1.

Witnesses:

Inventor,
Bernardo Dominguez,
by Joshua R. H. Hoyt
his Attorney.

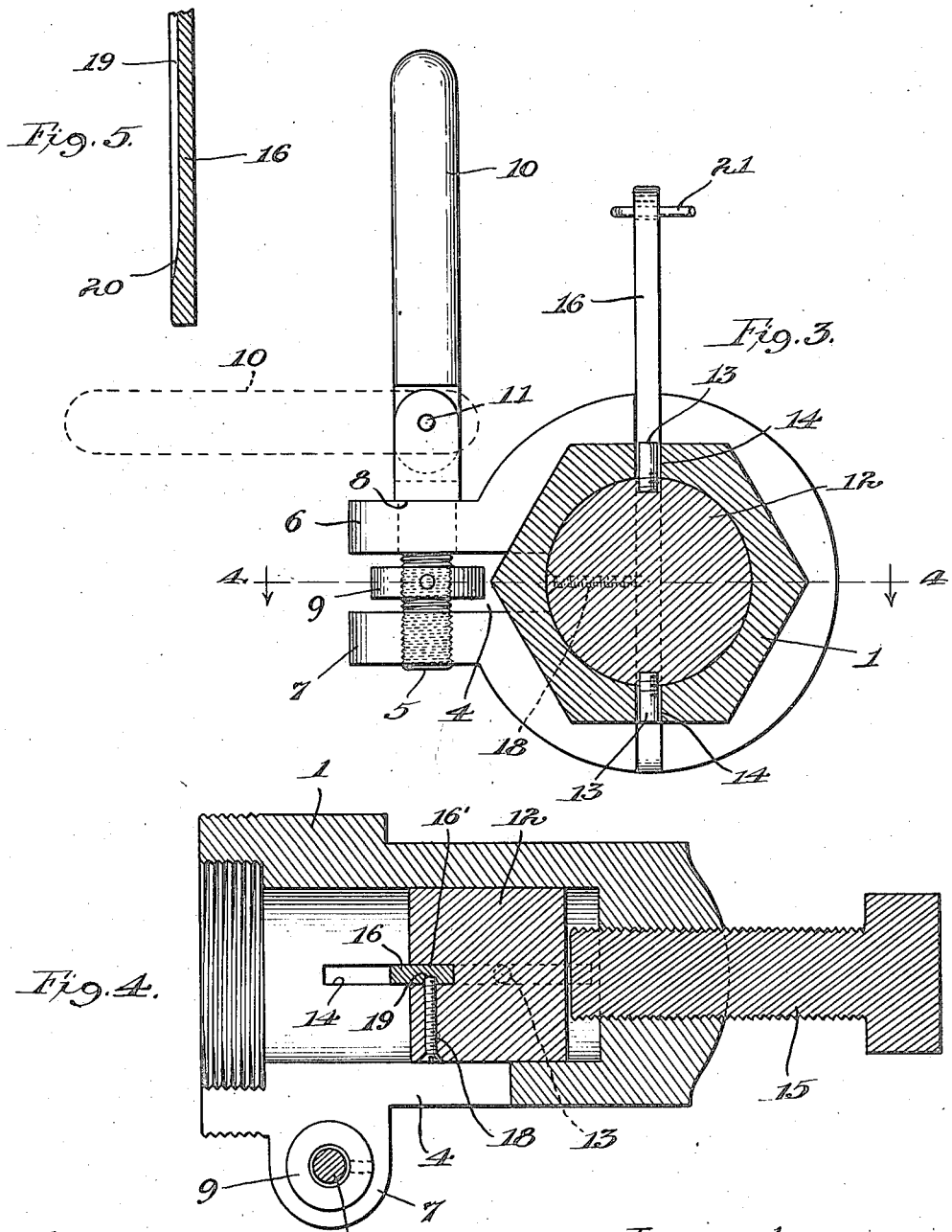

UNITED STATES PATENT OFFICE.

BERNARDO DOMINGUEZ, OF CHICAGO, ILLINOIS.

REMOVER FOR WHEELS OR THE LIKE.

1,229,725.　　　　　　Specification of Letters Patent.　　Patented June 12, 1917.

Application filed April 8, 1916. Serial No. 89,854.

*To all whom it may concern:*

Be it known that I, BERNARDO DOMINGUEZ, a citizen of Mexico, and a resident of the city of Chicago, county of Cook, and State of Illinois, have invented certain new and useful Improvements in Removers for Wheels or the like, of which the following is a specification.

My invention relates to improvements in devices designed for use in removing or pulling a wheel or other device from the shaft or spindle upon which the same is mounted.

The object of my invention is the production of a device of this character which may be readily and expeditiously applied and removed, one which will be adapted to so clamp the hub of the member to be removed as to prevent stripping or marring of the threads of the hub, and one in which great pressure may be developed so as to render it possible to readily remove a wheel or other device which may be securely locked to its shaft.

A still further object is the production of a device as mentioned which will be of durable and economical construction, and of high efficiency in use.

Other objects will appear hereinafter.

With these objects in view, the invention consists in the combinations and arrangements of parts hereinafter described and claimed.

The invention will be best understood by reference to the accompanying drawings forming a part of this specification, and in which, Figure 1 is a central longitudinal section of a remover embodying the invention, showing the same applied for use, Fig. 2 is a top plan view of Fig. 1, Fig. 3 is a section taken on line 3—3 of Fig. 2, Fig. 4 is a section taken on line 4—4 of Fig. 3, and Fig. 5 is a detail longitudinal section of the wedge included in the construction.

The preferred form of construction, as illustrated in the drawings, comprises a body 1 substantially cup-shaped in form which is both internally and externally screw-threaded for engagement with the threaded hub 2 of the wheel 3 or other device in connection with which the device is employed. In the drawings only the internal threads of the member 1 are utilized because of the fact that the hub 2 is externally threaded. It frequently happens, however, that the hubs of vehicle wheels are internally instead of externally threaded, in which case the external threads of the member 1 may be employed.

The engaging end of the member 1 is formed with a longitudinally extending slit 4, as clearly shown in Figs. 3 and 4, which permits of contraction and expansion of the member 1 for securely clamping the same onto the hub to be engaged. Through the clamping action it is, of course, apparent that the frictional engagement of the device with the hub alleviates considerable of the shearing strain on the threads and thus serves to prevent stripping or marring of the threads of the hub, such as frequently results with wheel pullers in use at the present time.

This contraction and expansion of the engaging end of the member 1 is effected by means of a bolt 5 which passes loosely through a lug 6 projecting laterally from the member 1 and into threaded engagement with a companion lug 7 also projecting from said member 1, said lugs 6 and 7 being provided at opposite sides of the slit 4, as clearly shown in Fig. 3. The bolt 5 is provided with a shoulder 8 adapted to engage against the outer side of lug 6, and a collar 9 is fixed to said bolt between said lugs 6 and 7. Said bolt is provided at its outer end with a handle 10 hingedly or tiltably connected therewith at 11. With this arrangement, it will be seen that when the bolt is rotated in a clockwise direction, the threads of said bolt engaging with the lug 7, and the shoulder 8 of said bolt engaging with the lug 6, will serve to contract the member 1. Upon opposite rotation of said bolt, the threads of said bolt engaging with the lug 7 and the collar 9 engaging against the inner side of lug 6, will serve to expand the member 1. The tiltable connection of the handle 10 permits of operation of the same in places where the space for operation is limited and confined, as will be readily understood.

Loosely mounted in the member 1 is an abutment block 12 held against rotation therein by diametric pins 13 which loosely engage with elongated diametric slots 14 formed in said member 1. A screw 15 threaded in the outer end of member 1 serves as a means of adjusting the position of the block 12 longitudinally of the member 1.

Coöperating with the abutment member 12 is a wedge 16 adapted, in the use of the device, to engage against the outer end of the shaft 17 upon which the wheel or other member to be removed is mounted, the arrangement being such that forward driving of the wedge will have the effect of forcing the shaft in one direction and the wheel in the other direction, and thus effect removal of the latter. Said wedge engages a transversely extending slot 16′ formed in the block 12, and is locked against movement relative to said block, except in a direction longitudinally of said wedge, by means of a screw or pin 18 threaded in said block which engages with a longitudinally extending groove 19 formed in one side of said wedge extending parallel with the edge of the same which engages with said block. As seen in Fig. 5 one end of the groove 19 is inclined to form a cam surface 20 which is adapted for engagement with the member 18 in order to yieldingly hold said wedge against relative longitudinal movement when desired, as during rotation of the member 1 to position upon the hub of the wheel or other device to be removed. With this arrangement, by shifting the wedge longitudinally to effect forcible engagement of the inner end of member 18 with the cam surface 20, the frictional engagement between said cam surface and member will be sufficient to yieldingly hold the wedge against relative sliding during rotation of the device. In order to prevent detachment of the wedge from the member 1, a cotter pin 21 is provided at one end of said wedge, the arrangement being such, however, that said wedge may be completely detached by simply removing said cotter pin.

The construction is such, also, that if desired the wedge 16 may be completely removed and the screw 15 actuated to thrust the member 12 into engagement with the shaft from which the wheel or other device is to be removed.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A device for the removal of a wheel or the like from a shaft, comprising a body adapted for engagement with the hub of the member to be removed; a wedge mounted for movement transversely of said body for engagement with the end of the shaft; and an abutment member adjustably mounted in said body for coöperation with said wedge, substantially as described.

2. A device for the removal of a wheel or the like from a shaft, comprising a body adapted for engagement with the hub of the member to be removed; a wedge mounted for movement transversely of said body for engagement with the end of the shaft; an abutment member adjustably mounted in said body for coöperation with said wedge; and means for adjusting the position of said abutment member in said body, substantially as described.

3. A device for the removal of a wheel or the like from a shaft, comprising a body adapted for engagement with the hub of the member to be removed; a wedge mounted for movement transversely of said body for engagement with the end of the shaft; an abutment member adjustably mounted in said body for coöperation with said wedge; and a screw threaded in said body for adjusting the position of said abutment member in said body, substantially as described.

4. A device for the removal of a wheel or the like from a shaft, comprising a body adapted for engagement with the hub of the member to be removed; a wedge mounted for movement transversely of said body for engagement with the end of the shaft; an abutment for coöperation with said wedge; and means being provided for locking said wedge against movement relative to said abutment except in a direction longitudinally of said wedge, substantially as described.

5. A device for the removal of a wheel or the like from a shaft, comprising a body adapted for engagement with the hub of the member to be removed; a wedge mounted for movement transversely of said body for engagement with the end of the shaft; an abutment for coöperation with said wedge; and a pin and groove connection between said wedge and said abutment being provided for locking said wedge against movement relative to said abutment except in a direction longitudinally of said wedge, substantially as described.

6. A device for the removal of a wheel or the like from a shaft, comprising a body adapted for engagement with the hub of the member to be removed; a wedge mounted for movement transversely of said body for engagement with the end of the shaft; an abutment for coöperation with said wedge; and means for locking said wedge against movement relative to said abutment except in a direction longitudinally of said wedge, said means comprising a projection on said abutment loosely engaging with a longitudinally extending groove in said wedge, substantially as described.

7. A device for the removal of a wheel or the like from a shaft, comprising a body adapted for engagement with the hub of the member to be removed; a wedge mounted for movement transversely of said body for engagement with the end of the shaft; an abutment for coöperation with said wedge; means for locking said wedge against movement relative to said abutment except in a direction longitudinally of said wedge, said means comprising a projection on said abutment loosely engaging with a longitudinally extending groove in said wedge; and a removable stop on said wedge for locking the same against detachment from said body, substantially as described.

8. A device for the removal of a wheel or the like from a shaft, comprising a body adapted for engagement with the hub of the member to be removed; a wedge mounted for movement transversely of said body for engagement with the end of the shaft; an abutment for coöperation with said wedge; and means for locking said wedge against longitudinal movement, substantially as described.

9. A device for the removal of a wheel or the like from a shaft, comprising a body adapted for engagement with the hub of the member to be removed; a wedge mounted for movement transversely of said body for engagement with the end of the shaft; an abutment for coöperation with said wedge; a pin and groove connection between said wedge and said abutment for locking said wedge against movement relative to said abutment except in a direction longitudinally of said wedge; and a cam surface at the end of said groove for engagement with said pin for yieldingly locking said wedge against longitudinal movement, substantially as described.

10. A device for the removal of a wheel or the like from a shaft, comprising a body adapted for engagement with the hub of the member to be removed; a wedge mounted for movement transversely of said body for engagement with the end of the shaft; and an abutment member adjustably mounted in said body for coöperation with said wedge, said abutment member having a transversely extending slot in one end for the reception of said wedge, substantially as described.

11. A device for the removal of a wheel or the like from a shaft, comprising a body adapted for engagement with the hub of the member to be removed; a wedge mounted for movement transversely of said body for engagement with the end of the shaft; an abutment member adjustably mounted in said body for coöperation with said wedge, said abutment member having a transversely extending slot in one end for the reception of said wedge; and a pin in said abutment member engaging a longitudinally extending groove in said wedge for locking the latter against movement relative to said abutment member except in a direction longitudinally of said wedge, substantially as described.

12. A device for the removal of a wheel or the like from a shaft comprising a body substantially cup-shaped in form adapted for engagement with the hub of the member to be removed, the engaging end of said member being longitudinally split; means for expanding or contracting said end of said member, said means comprising lugs on said body at opposite sides of the split therein; a bolt passing loosely through one of said lugs and in threaded engagement with the other lug; said bolt having a shoulder for engagement with the first mentioned lug; a collar on said bolt positioned between said lugs for engagement with one of said lugs; means for rotating said bolt; and means coöperating with said body for engagement with the end of the shaft, substantially as described.

13. A device for the removal of a wheel or the like from a shaft comprising a body substantially cup-shaped in form adapted for engagement with the hub of the member to be removed, the engaging end of said member being longitudinally split; means for expanding or contracting said end of said member, said means comprising lugs on said body at opposite sides of the split therein; a bolt passing loosely through one of said lugs and in threaded engagement with the other lug; said bolt having a shoulder for engagement with the first mentioned lug; a collar on said bolt positioned between said lugs for engagement with one of said lugs; a handle for rotating said bolt, tiltably connected therewith; and means coöperating with said body for engagement with the end of the shaft, substantially as described.

In testimony whereof I have signed my name to this specification in the presence of two subscribing witnesses.

BERNARDO DOMINGUEZ.

Witnesses:
JOSHUA R. H. POTTS,
HELEN F. LILLIS.